Sept. 6, 1966 TAO-YUAN WU 3,271,014
ALTITUDE COMPENSATED CHARGE FORMING DEVICE
Filed Dec. 27, 1963 2 Sheets-Sheet 1
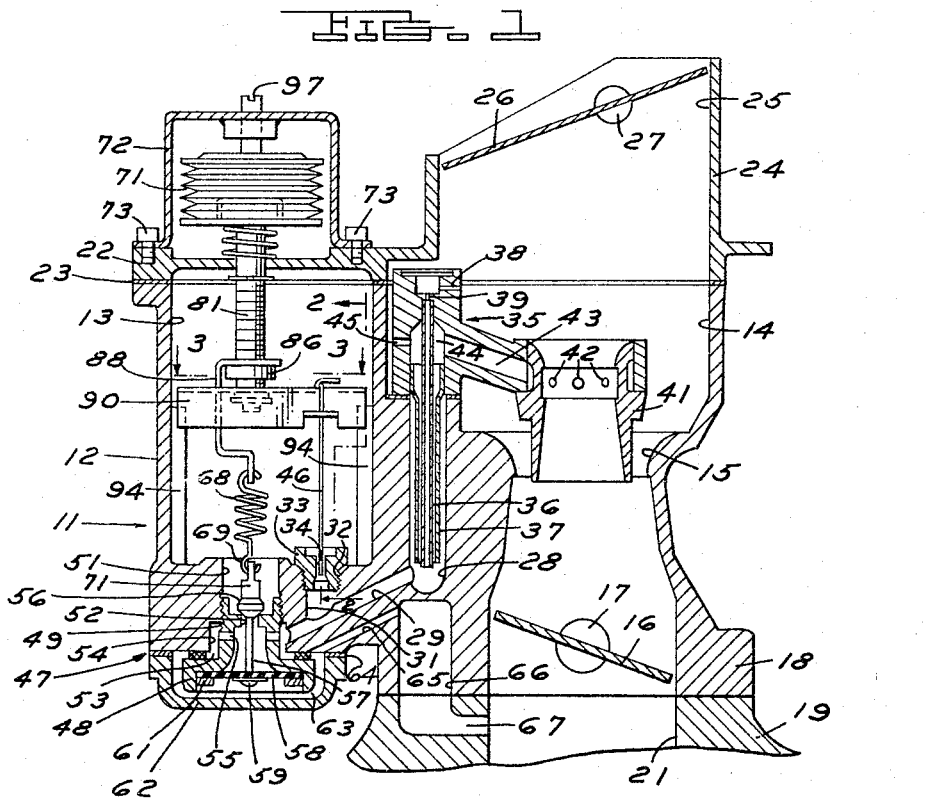
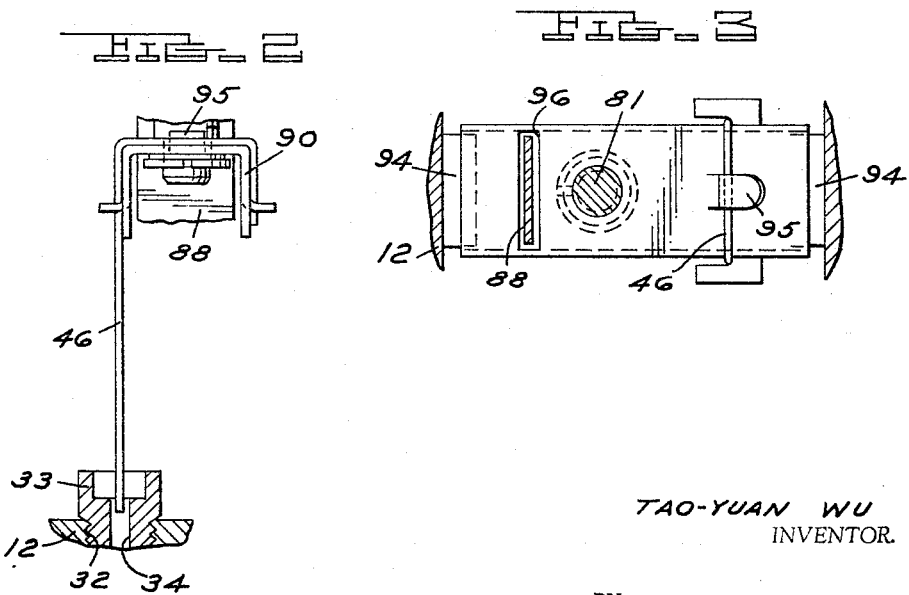
TAO-YUAN WU
INVENTOR.
BY John R. Faulkner
Ernest A. Beutler
ATTORNEYS

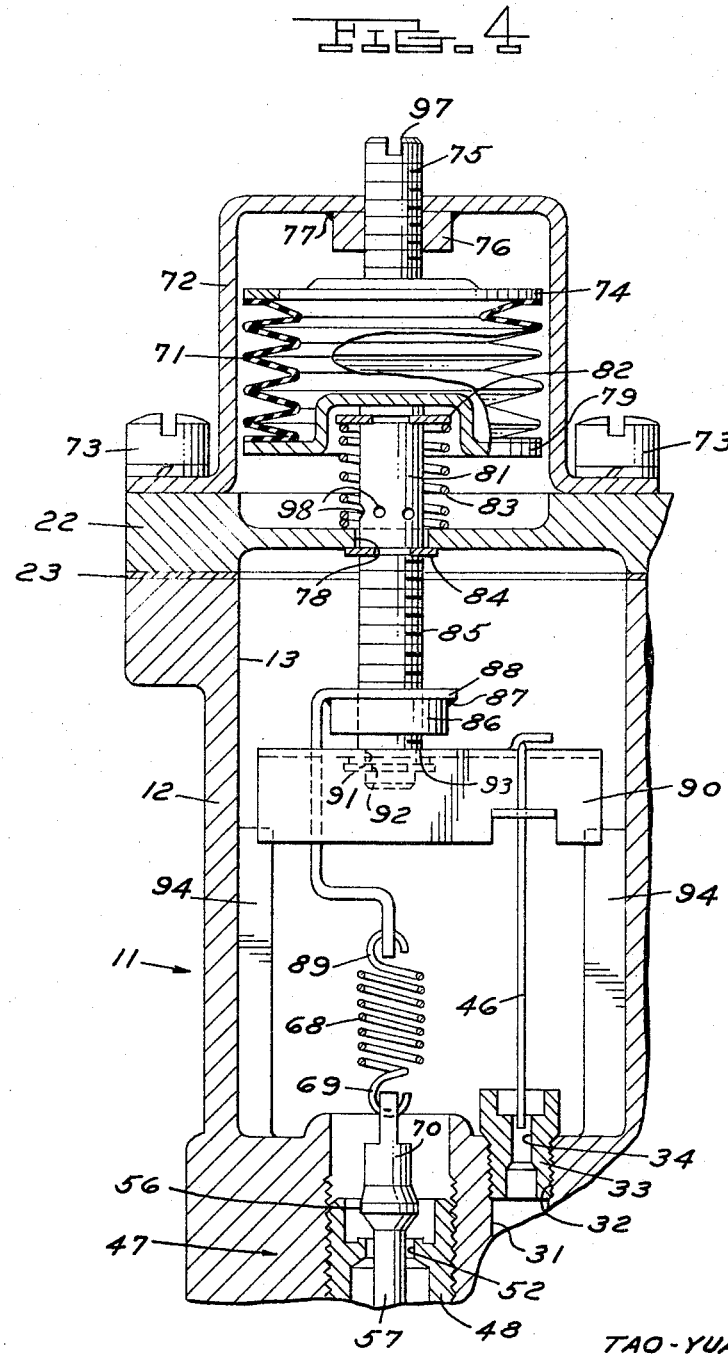

United States Patent Office 3,271,014
Patented Sept. 6, 1966

3,271,014
ALTITUDE COMPENSATED CHARGE
FORMING DEVICE
Tao-Yuan Wu, Ann Arbor, Mich., assignor to Ford Motor
Company, Dearborn, Mich., a corporation of Delaware
Filed Dec. 27, 1963, Ser. No. 333,948
7 Claims. (Cl. 261—43)

This invention relates to a charge forming device for an internal combustion engine that embodies an improved fuel metering system and additionally relates to an improved altitude responsive charge forming device.

In internal combustion engine charge forming device must supply accurately metered quantities of fuel and air to suit all operating requirements of the engine. Various devices have been employed to meter the fuel discharge in response to the engine requirements. In one common form of fuel metering device, a tapered metering rod is inserted into a metering jet to vary the cross-sectional flow area of a fuel discharge circuit. A metering rod can provide accurately regulated fuel flow if rigid manufacturing tolerances are employed. It is extremely difficult, however, to form correctly the tapered metering rod because of the small sizes involved. It additionally is difficult to align the metering rod support with respect to the metering jet. If the metering rod is displaced from the axis of the metering jet, a variation in fuel flow will result. The variation is not uniform for all positions of the metering rod within the metering jet.

It, therefore, is an object of this invention to provide a charge forming device having an improved method of fuel metering.

An internal combustion engine that powers a motor vehicle is subjected to widely varying speed and power requirements. In addition, the engine operates under differing climatic conditions and at various altitudes. The charge forming device of the engine of a motor vehicle, therefore, must supply the proper fuel-air ratio under extreme conditions.

Although the charge forming device may be designed and calibrated to meet all of the engine requirements at a given altitude, a change in the altitude can seriously affect the calibration. The fuel discharge during steady state running is generally governed by the rate of air flow through the induction passages of the charge forming device. As the altitude increases, the density of the air decreases and a wide throttle setting is required to sustain a given power output. The charge forming device, therefore, tends to run richer as the altitude increases because of the increased velocity of the air flowing through the induction passages.

A vehicular charge forming device also is provided with some form of power enrichment mechanism. The power enrichment mechanism is responsive to engine intake manifold and discharges additional fuel during periods of low manifold vacuum. As the operating altitude increases, the wider opening of the throttle valve to provide sufficient mass air flow to compensate for the rarefied atmosphere also reduces manifold vacuum. The reduced intake manifold vacuum causes the power enrichment mechanism to discharge prematurely.

A conventional charge forming device of an internal combustion engine, therefore, will discharge an overrich mixture as the altitude increases to result in poor fuel economy. The poor fuel economy is compounded because of an enrichment in the main metering system and premature opening of the power enrichment device.

It, therefore, is another object of this invention to provide a charge forming device that if fully altitude compensated.

Although altitude compensated carburetors previously have been proposed, they generally do not fully compensate both the main metering system and the power enrichment mechanism for altitude. Where they do provide altitude compensation for both of these fuel discharge systems, they are unduly complex.

It is a further object of this invention to provide a simplified method of completely compensating a charge forming device for altitude variations.

An internal combustion engine charge forming device embodying this invention has a fuel source, an induction passage, and means for discharging fuel from the fuel source into the induction passage. The fuel discharge means includes a main metering system and a power valve. Both the power valve and main metering system are altitude compensated by a single pressure responsive device.

As a further feature of this invention, the relationship between the main metering system and the altitude responsive device and between the power valve and the altitude responsive device may be independently adjusted.

A charge forming device embodying this invention further incorporates a novel fuel metering system. In the fuel metering system, a metering jet and metering rod are provided. The metering rod is adapted to be inserted various distances into the metering jet and has a substantially constant cross-sectional area and shape. The external surface of the metering rod has a predetermined surface finish to offer frictional resistance to flow that varies with the depth of insertion of the metering rod into the metering jet.

Further objects and advantages of this invention will become more apparent when considered in conjunction with the accompanying drawings; wherein:

FIGURE 1 is a cross-sectional view of a charge forming device for an internal combustion engine embodying this invention.

FIGURE 2 is a cross-sectional view taken along line 2—2 of FIGURE 1.

FIGURE 3 is a cross-sectional view taken substantially along the lines 3—3 of FIGURE 1.

FIGURE 4 is an enlarged cross-sectional view of the altitude compensating portion of the charge forming device shown in FIGURE 1 showing the parts in a slightly different position.

Turning now in detail to the drawings, an altitude compensated carburetor is indicated generally by the reference numeral 11. The carburetor 11 includes a body portion 12 that forms a fuel bowl 13 and an induction passage 14 having a venturi section 15. A flow regulating throttle valve 16 is supported for rotation with a throttle valve shaft 17 at the lower end of the induction passage 14. The body portion 12 also has a mounting flange 18 that is adapted to be secured to an intake manifold 19 of an internal combustion engine. An induction passage 21 of the intake manifold 19 is aligned with the induction passage 14 of the body portion 12.

A cover plate 22 is secured to the body portion 12 by a plurality of threaded fasteners (not shown). A gasket 23 is positioned between the cover plate 22 and the body portion 12. The cover plate 22 has a raised air horn portion 24 forming an inlet passage 25 that registers with the induction passage 14 in the body portion 12. A choke valve 26 is supported for rotation with a choke valve shaft 27 in the air horn portion 24 to provide enrichment for cold starting.

A main fuel well 28 is formed in the body portion 12 between the induction passage 14 and the fuel bowl 13. A transverse fuel channel 29 extends from beneath the fuel bowl 13 to the lower end of the main fuel well 28. An upwardly extending passage 31 extends from the transverse fuel channel 29 vertically toward the fuel bowl 13. The passage 31 is threaded, as at 32, adjacent its upper end to receive a main metering jet 33 having a calibrated orifice 34. Fuel is maintained at a substantially constant level in the fuel bowl 13 by a float-operated valve (not shown) or other similar device. The fuel may flow from the fuel bowl 13 through the main metering jet orifice 34 into the transverse fuel channel 29 and into the main fuel well 28.

A booster nozzle assembly, indicated generally at 35, is secured to the body portion 12 at one side of the induction passage 14. Concentric idle and main fuel tubes 36 and 37, respectively, depend from the booster nozzle assembly 35 into the main fuel well 28. An idle air bleed 38 formed at the upper end of the booster nozzle assembly 35 permits air to mix with fuel that travels up the idle fuel tube 36 from the main fuel well 28. The incoming air forms a fuel-air emulsion that is discharged from an idle conduit (not shown) into the induction passage 14 adjacent the idle position of the throttle valve 16. An idle restriction 39 at the upper end of the idle tube 36 regulates the rate of idle fuel discharge.

The booster nozzle assembly 35 has a small venturi portion 41 that is positioned with its lower end adjacent the venturi section 15 of the induction passage 14. A plurality of discharge ports 42 are formed around the periphery of the small venturi portion 41. The discharge ports 42 communicate through a transverse passage 43 with a cavity 44 formed at the upper end of the booster nozzle assembly 35. The cavity 44 is in open communication with the upper end of the main fuel tube 37. Fuel may be drawn from the main fuel well 28 through the main fuel tube 37 to form a fuel-air emulsion with air that enters through a main air bleed 45. The fuel-air emulsion is discharged from the cavity 44 through the transverse passage 43 and discharge ports 42 into the induction passage 14 in the low pressure area existing at the venturi section 15. The rate of main fuel discharge is governed by the main metering jet 33.

The lower end of a metering rod 46 is inserted into the calibrated orifice 34 of the main metering jet 33 to vary the flow rate. The portion of the metering rod 46 that is adapted to be inserted into the metering jet 33 has a substantially uniform diameter along its length. The rate of fuel flow is varied by forming the external surface of the metering rod 46 with a predetermined surface finish. By varying the distance the metering rod 46 is inserted into the orifice 34, the frictional resistance to fluid flow is changed to vary the fuel flow rate. The desired surface finish for the metering rod 46 is dependent upon the diameter of the metering rod 46, the diameter of the orifice 34 and the desired rate of fuel flow. It is comparatively easy to insure a substantially uniform finish along the length of the metering rod 46. This method of varying the rate of fuel flow is considerably more satisfactory than would be possible by varying the diameter of the metering rod as was heretofore common. The degree of insertion of the metering rod 46 into the metering jet 33 is varied by an altitude responsive device that will be described as this description proceeds.

The fuel flow through the main metering jet 33 is sufficient to meet the engine's fuel requirements during normal stages of engine operation. During periods of high power demand, some form of supplemental fuel enrichment is required. A power valve, indicated generally by the reference numeral 47, meets these requirements. The power valve 47 comprises a fitting 48 having a threaded end 49 that is threaded into the lower end of a tapped opening 51 in the carburetor body portion 12 adjacent the bottom of the fuel bowl 13. The fitting 48 has a fuel passage that is restricted as at 52. An angular cavity 53 is formed between the fitting 48 and an enlarged bore 54 formed in the lower surface of the carburetor body portion 12. The annular cavity 53 is in communication with the lower end of the transverse fuel channel 29. The fitting 48 has a plurality of radial holes 55 that permit fuel to flow from the fuel bowl through the restricted passage 52 into the cavity 53 and thence into the main fuel well 28.

A movable valve member having an enlarged central portion 56 is adapted to open and close the restricted passage 52 in the fitting 48 to control the flow of fuel from the fuel bowl 13 into the main fuel well 28. The valve member has a downwardly extending stem portion 57 that terminates within an enlarged lower end of the fitting 48. A flexible diaphragm 58 is affixed to the lower end of the stem portion 57, as at 59. The periphery of the diaphragm 58 is held in the enlarged end of the fitting 48 by a snap ring 61. A power valve cover plate 62 is secured to the underside of the carburetor body portion 12 adjacent the fitting 48 to form a pressure tight cavity 63 on the lower side of the diaphragm 58. The cavity 63 is separated from the fuel cavity 53 by a gasket 64 interposed between the power valve cover plate 62 and the carburetor body portion 12.

The cavity 63 is exposed to intake manifold vacuum so that the diaphragm 58 acts to position the valve member in response to pressure variations. A vacuum passage 65 extends in the carburetor body portion 12 from the cavity 63 through the gasket 64. The vacuum passage 65 terminates in an enlarged opening 66 formed in the body portion 12 adjacent the induction passage 14. The opening 66 terminates in the lower surface of the mounting flange 18. The termination of the opening 66 registers with a vacuum passage 67 formed in the intake manifold 19. The vacuum passage 67 opens into the induction passage 21 of the intake manifold 19.

A coil tension spring 68 has its lower end 69 connected to an upper stem portion 70 of the movable power valve member. The coil spring 68 opposes the action of the diaphragm 58 and tends to move the valve member toward its open position. When the engine is operating at normal loads, the intake manifold vacuum at the induction passage 21 is transmitted through the vacuum passages 67 and 66 and opening 65 to the annular cavity 63. The vacuum causes the diaphragm 58 to be deflected downwardly and move the valve member enlarged portion 56 into contact with the restricted passage 52 (FIGURE 1). The coil spring 68 is elongated during this operation and fuel cannot pass from the fuel bowl 13 into the main fuel well 28.

When the engine is heavily loaded, an increased power demand will be indicated by a reduction in the vacuum or increase in pressure in the intake manifold induction passage 21. The decreased vacuum is transmitted to the cavity 63 through vacuum passages 65 and 67 and opening 66. At a predetermined manifold vacuum, the diaphragm 58 can no longer resist the action of the coil spring 68 and the power valve member is moved upwardly. The enlarged portion 56 moves away from the restricted passage 52 and fuel may flow into the cavity 53. From the cavity 53, fuel is drawn into the main well 28 through the transverse passage 29. The fuel flow through the power valve 47 supplements the fuel flow through the main metering jet 33 to satisfy the increased power requirement of the engine.

The carburetor as thus far described will operate as a conventional carburetor with the normal engine running requirements being satisfied by the fuel flow through the main metering jet 33. The increased fuel requirements at high power outputs provided by the flow through the main metering jet 33 and flow through the power valve 47. Assuming that the carburetor 11 is calibrated to satisfy the engine requirements at sea level, an increase in altitude, unless compensated for, will cause the carburetor to run rich. As the altitude increases and density of air decreases, the throttle valve 16 must be opened wider to sustain a given power output. The wider opening of the throttle valve 16 increases the velocity of air flow through the venturi section 15 and decreases the static pressure at the booster nozzle discharge ports 42. The decreased pressure causes an increased amount of fuel to be drawn through the main metering jet 33. Since the increased fuel flow is mixed with substantially the same mass flow of air, a richer than normal fuel-air mixture will result. In addition, at periods of high power output the pressure in the intake manifold 19 will decrease as the altitude increases and the coil spring 68 tends to open the power valve 47 earlier than normal. This will also result in a substantial unnecessary enrichment of the fuel-air mixture. To prevent the aforementioned enrichment at higher altitudes, an altitude compensating device now to be described is provided.

A pressure responsive metallic bellows or aneroid 71 is supported within an inverted cup-shaped member 72 that is affixed to the cover plate 22 by a plurality of threaded fasteners 73. The aneroid 71 has a substantially rigid upper plate 74 to which a stud 75 is affixed. The stud 75 is threaded into a nut 76 that is affixed to the upper surface of the cup-shaped member 72, as by the weld 77. The interior of the cup-shaped member 72 is open to the fuel bow 13 through an aperture 78 formed in the cover plate 22. The pressure within the cup-shaped member 72 and around the aneroid 71, therefore, will be substantially the same as the air pressure above the fuel in the fuel bowl 13.

A substantially rigid lower surface 79 of the aneroid 71 is contacted by a rod 81 that extends through the aperture 78 into the fuel bowl 13. A snap ring 82 is affixed to the upper end of the rod 81 and a coil spring 83 is compressed between the snap ring 82 and the cover plate 22 to urge the rod 81 upwardly into engagement with the aneroid lower surface 79. A snap ring 84 is affixed to the rod 81 below the cover plate 22 to limit the upward movement of the rod 81.

The lower end of the rod 81 is threaded, as at 85, to provide an adjustable connection with a nut 86. The nut 86 is welded, as at 87, to a bracket 88 that extends downwardly into the fuel bowl 13. The lower end of the bracket 88 is formed with an aperture that receives the upper end 89 of the coil spring 68 of the power valve assembly 47. Vertical movement of the rod 81, therefore, adjusts the preload on the coil spring 68.

An inverted channel-shaped bracket 90 has an aperture 91 through which the lower end of the rod 81 extends below the nut 86. The channel-shaped bracket 90 is affixed axially with respect to the rod 81 by a snap ring 92 that holds the channel-shaped member 90 against a shoulder 93 on the lower end of the rod 81. The rod 81 may rotate, however, within the channel-shaped bracket 90. The downturned legs of the channel-shaped bracket 90 straddle bosses 94 formed on the sides of the fuel bowl 13 to prevent rotation of the channel-shaped bracket 90 (FIGURE 3).

The uper end of the metering rod 46 extends across the top of the channel-shaped bracket 90 and is affixed thereto by a tab 95. Reciprocation of the rod 81 causes reciprocation of the channel-shaped bracket 90 to vary the degree of insertion of the metering rod 46 within the metering jet orifice 34. The bosses 94 serve to fix the axial location of the metering rod 46 in the orifice 34. The bracket 88 extends downwardly through an elongated aperture 96 formed in the upper surface of the channel-shaped bracket 90.

As the altitude increases, the pressure of the air above the fuel in the fuel bowl 13 and around the aneroid 71 decreases. The decreased pressure permits the aneroid 71 to expand and urge the rod 81 downwardly against the action of the coil spring 83. Downward movement of the rod 81 is accomplished by similar movement of the bracket 88 and the channel-shaped bracket 90. The downward movement of the bracket 88 decreases the tension on the coil spring 68 which means that a lesser degree of manifold vacuum is required to cause the diaphragm 58 to move the enlarged portion 56 of the valve member into engagement with the restricted passage 52. Said another way, the manifold vacuum necessary to hold the power valve 47 in a closed position decreases as altitude increases.

Downward movement of the channel-shaped bracket 90 causes the metering rod 46 to be inserted a greater distance into the orifice 34 of the metering jet 33 The increased penetration of the metering rod 46 causes an increased frictional resistance to flow through the metering jet 33 and a decrease in the rate of fuel discharge.

It should be seen, therefore, that as the altitude increases, the aneroid causes the coil spring 68 to exert a decreased effect on the movable valve member 56 and also causes the metering rod 46 to offer an increased resistance to fuel flow. Both the power valve 46 and main metering system, therefore, are altitude compensated.

Provision is made to adjust both the metering rod 46 and the power valve spring 68 with respect to the aneroid 71. This adjustment permits individual engine requirements to be satisfied. The stud 75 that supports the aneroid 71 is slotted at 97 to permit the aneroid 71 to be adjusted vertically with respect to the carburetor body 12 and cover plate 22. Vertical adjustment of the aneroid 71 also causes the rod 81 to be adjusted vertically and move the position of both the bracket 88 and metering rod 46. The coil spring 68 and bracket 88 may be adjusted independently of the position of the metering rod 46 by inserting an elongated tool into any aperture 98 formed in the rod 88 above the cover plate 22. By turning the rod 81, the nut 86 is threaded upwardly or downwardly upon the threaded portion 85. The position of the channel-shaped bracket 90 will be unaffected since it is journaled upon the rod 81 between the shoulder 93 and snap ring 92.

It should be readily apparent that through the disclosed construction a signal aneroid may be used to compensate both the power valve and main metering system of a carburetor for altitude variations. In addition it should also be apparent that if altitude compensation is not required, the aneroid may be easily omitted from the carburetor along with the attendant connections to the power valve spring 68. The metering rod 46 is then omitted and a proper size metering jet 33 is installed. A power valve spring will still be required; however, this spring may be secured to some other portion of the carburetor to provide a fixed preload.

It is to be understood that various changes and modifications may be made without departing from the spirit and scope of the invention as defined by the appended claims.

I claim:

1. A charge forming device for an internal combustion engine comprising an induction passage, a throttle valve in said induction passage, a fuel source, fuel discharge circuit means connecting said fuel source with said induction passage for discharging fuel into said induction passage, metering valve means in said fuel discharge circuit means for regulating the rate of fuel discharge into said induction passage, said metering valve means comprising a metering jet through which at least a portion of the fuel discharge passage passes and a metering rod adapted to be inserted varying depths into said metering jet, said metering rod having a substantially uniform cross-sectional area and shape along at least a portion of the length that is adapted to be inserted into said metering jet whereby the cross-sectional flow area is relatively independent of the degree of insertion of said metering rod into said metering jet, the external surface of said metering rod having a predetermined surface finish to offer a frictional resistance to flow dependent upon the depth of insertion, power valve means in said fuel discharge circuit means responsive to the pressure in said induction passage posterior to said throttle valve, said power valve means being adapted to open at a predetermined pressure to provide additional fuel flow into said induction passage in response to increased engine power demand, an altitude responsive device, and means operatively connecting said altitude responsive device to said power valve and to said metering rod for simultaneously adjusting the pressure at which said power valve opens and the depth of insertion of said metering rod into said metering jet in response to altitude variations.

2. A charge forming device as defined by claim 1 wherein the operative connection between said altitude responsive device and said power valve is adjustable and the operative connection between said altitude responsive device and said metering rod is adjustable.

3. A charge forming device for an internal combustion engine comprising an induction passage, a throttle valve in said induction passage, a fuel source, fuel discharge circuit means interconnecting said fuel source with said induction passage for discharging fuel into said induction passage, metering valve means in said fuel discharge circuit means for regulating the rate of fuel discharge into said induction passage, said metering valve means comprising a metering jet through which at least a portion of the fuel discharge passes and a metering rod adapted to be inserted varying depths into said metering jet, said metering rod having a substantially uniform cross-sectional area and shape along at least a portion of the length that is adapted to be inserted into said metering jet whereby the cross-sectional flow area is relatively independent of the degree of insertion of said metering rod into said metering jet, the external surface of said metering rod having a predetermined surface finish to offer a frictional resistance to flow that varies with the degree of insertion, power valve means in said fuel discharge circuit means for providing additional fuel flow into said induction passage during periods of increased engine power demand, said power valve means including a movable valve member for controlling fuel flow, pressure responsive means for actuating said movable valve member in response to variations in pressure in said induction passage posterior to said throttle valve, resilient means biasing said movable valve member in opposition to said pressure responsive means, an altitude responsive device, means operatively connecting said altitude responsive device to said metering rod to vary the depth of insertion of said metering rod into said metering jet in response to altitude variations, and means operatively connecting said altitude responsive device to said resilient means of the power valve means for varying the effect of said resilient means in response to altitude variations.

4. A charge forming device as defined by claim 3 wherein the operative connection between the altitude responsive device and the metering rod is adjustable and the operative connection between the altitude responsive device and the resilient means is adjustable.

5. A charge forming device for an internal combustion engine comprising an induction passage, a throttle valve in said induction passage, a fuel source, fuel discharge circuit means interconnecting said fuel source with said induction passage for discharging fuel into said induction passage, metering valve means in said fuel discharge circuit means for regulating the rate of fuel discharge into said induction passage, said metering valve means comprising a metering jet through which at least a portion of the fuel discharge passes and a metering rod adapted to be inserted varying depths into said metering jet, said metering rod having a substantially uniform cross-sectional area and shape along at least a portion of the length that is adapted to be inserted into said metering jet whereby the cross-sectional flow area is relatively independent of the degree of insertion, the exterior surface of said metering rod having a predetermined surface finish to offer a frictional resistance to flow dependent upon the depth of insertion of said metering rod into said metering jet, power valve means in said fuel discharge circuit means for providing additional fuel flow into said induction passage during periods of increased engine power demand, said power valve means including a movable valve member for controlling fuel flow, a diaphragm connected to said movable valve member, conduit means connecting one side of said diaphragm with said induction passage posterior to said throttle valve for moving said movable valve member to a closed position in response to a decrease in pressure in said induction passage, spring means operatively connected to said movable valve member, said spring means biasing said movable valve member toward an open position in opposition to the action of said diaphragm, an altitude responsive device, means operatively connecting said altitude responsive device to said metering rod for varying the insertion of metering rod into said metering jet in response to altitude variations, and means operatively connecting said altitude responsive device to the spring means of said power valve for varying the preload on said spring means in response to variations in altitude.

6. An altitude compensated carburetor for an internal combustion engine comprising an induction passage, a fuel bowl, means for maintaining a substantially uniform fuel head in said fuel bowl, a fuel discharge channel extending into said induction passage for discharging fuel into said induction passage, a main metering jet positioned in the lower surface of said fuel bowl in fluid communication with said fuel discharge channel, an enrichment channel extending from said fuel bowl into said fuel discharge channel, a movable valve member in said enrichment channel for controlling the flow of fuel therethrough a diaphragm operatively connected to the lower end of said movable valve member, a fluid conduit extending from the lower side of said diaphragm to said induction passage posterior to said throttle valve for actuating said movable valve member between an opened and a closed position in response to pressure variations, a coil spring connected at one of its ends to the upper end of said movable valve member, a metering rod supported in said fuel bowl for insertion into said main metering jet for varying the flow of fuel therethrough, said metering rod having a substantially uniform cross-sectional area and shape along at least a portion of the length that is adapted to be inserted into the metering jet whereby the cross-sectional flow area through said metering jet is relatively independent of the degree of insertion of said metering rod, the external surface of said metering rod having a predetermined surface finish to offer a frictional resistance to flow dependent upon the degree of insertion, a cover for said fuel bowl, an altitude responsive device supported by said cover, said altitude responsive device including a drive member movable in response to altitude variations, an adjustable connection between said drive member and the other end of said coil spring for varying the preload on said coil spring in response to altitude variations, an operative connection between said drive member and said metering rod for varying the insertion of said metering rod into said metering jet in response to altitude variations, and means for adjusting the altitude responsive device relative to the cover to vary the steady state position of said metering rod in said metering jet.

7. An altitude compensated carburetor as defined by claim 6 wherein said drive member is adjustable relative to said cover to vary the steady state position of said metering rod in said metering jet.

References Cited by the Examiner

UNITED STATES PATENTS

| | | | |
|---|---|---|---|
| 1,933,381 | 10/1933 | Mock et al. | 261—73 X |
| 2,227,267 | 12/1940 | Lozivit | 261—69 X |
| 2,394,663 | 2/1946 | Carlson et al. | 261—69 X |
| 2,426,741 | 9/1947 | Mock | 261—69 X |
| 2,531,479 | 11/1950 | Southern et al. | |
| 2,661,196 | 12/1953 | Ball | 261—69 X |
| 2,705,123 | 3/1955 | Hieger | 261—69 X |

HARRY B. THORNTON, *Primary Examiner.*

T. R. MILES, *Assistant Examiner.*